United States Patent Office 2,851,731
Patented Sept. 16, 1958

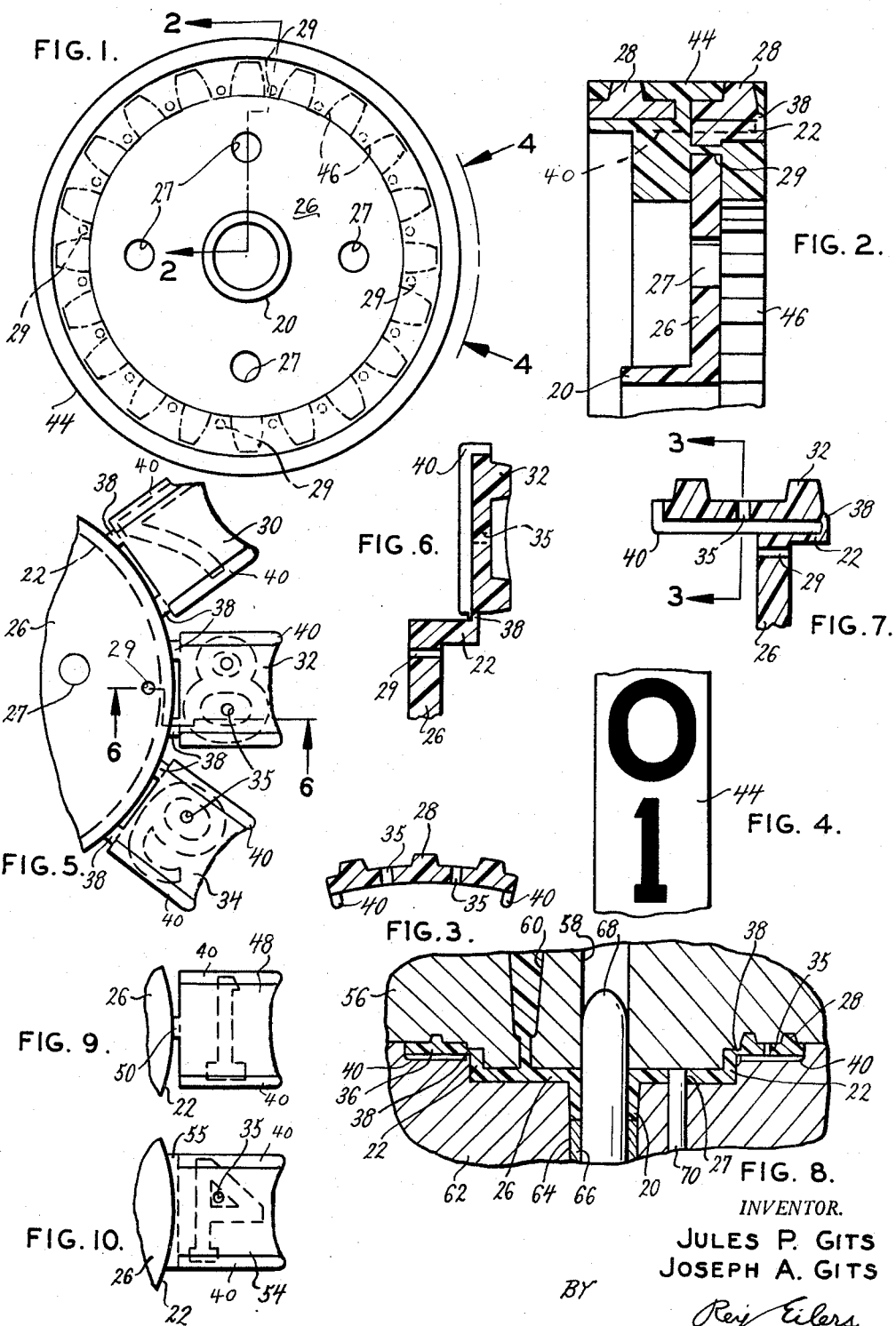

2,851,731
METHOD OF MOLDING ARCUATE INDICIA-CONTAINING ARTICLES

Jules P. Gits and Joseph A. Gits, Chicago, Ill.

Application April 21, 1955, Serial No. 502,952

13 Claims. (Cl. 18—47.5)

It is frequently desirable to make arcuate articles which have numerals, letters or other indicia in the arcuate surfaces thereof. The letters, numerals or other indicia could be formed from paint or another coating material; but it has been found that paints, on arcuate surfaces, tend to chip and crack, and that other coatings have similar objections. Furthermore, paints and other coatings would have to be applied manually; and manual operations unduly increase the costs of articles. For these reasons it has not been completely satisfactory to form numerals, letters and other indicia on arcuate articles from paint and other coatings. In recognition of this fact, Joseph A. Gits has shown and described a two-step method of molding articles, with arcuate indicia-containing surfaces, in his copending United States application for Letters Patent Serial Number 279,504 which was applied for March 31, 1952 and which bears the title Molded Articles And Methods Of Making Such Articles. The present invention facilitates the formation of molded articles of the same general type disclosed in said patent application.

The present invention provides a two-step method of forming molded articles with arcuate indicia-containing surfaces; and during the first step a body is formed which has indicia-defining plates projecting from it. Those plates initially project from the body in a radial direction, but can be moved so they extend axially of that body. It is desirable to have the indicia-defining plates initially project from the body in radial directions, because such an arrangement enables the indicia on those plates to be formed without any need of an expanding sectional die. Such dies are costly, and they leave separation marks on the surfaces of the objects which they form. Once the indicia-defining plates have been formed, they can then be moved into the positions they assume when they become part of the arcuate indicia-containing surface of the molded article. It is therefore an object of the present invention to provide a method of making a molded article with an arcuate indicia-containing surface which includes forming a body with radially extending indicia-defining plates and moving those plates so they are in the position they will assume when they become part of the arcuate indicia-containing surface of the molded article.

The indicia-defining plates are supported on yieldable connectors that are inturn supported on the body. Those connectors initially hold the indicia-defining plates in radially projecting position but permit those plates to be moved until they extend axially of that body. During such movement of the plates, the connectors guide and confine the plates and hold them against accidental separation from the body. It is therefore an object of the present invention to provide yieldable connectors between indicia-defining plates and the body which supports said plates.

Once the indicia-defining plates have been moved into positions where they extend axially of the body, a mass of molded material can be brought into engagement with the body and with the plates. That mass of molded material will positively bond and lock the plates in axial position, and will also provide a perfectly smooth arcuate indicia-containing surface for the molded article. It is therefore an object of the present invention to provide a method of making molded articles with arcuate indicia-containing surfaces that includes the formation of radially extending plates on a body, moving those plates into axial position, and surrounding and locking those plates with a mass of molded material.

The mass of molded material, which is added to the body and which locks the plates in axial position, will flow into intimate engagement with the plates and will coact with the indicia on those plates to provide indicia at the surface of the molded articles. In this way, it is possible to attain positive and precise definition of the indicia, and yet to attain a perfectly smooth arcuate surface for the molded article.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

In the drawing, Fig. 1 is a side elevational view of a molded article that has an arcuate indicia-containing surface and that is made in accordance with the principles and teachings of the present invention, Fig. 2 is a sectional view, on a larger scale, of a portion of the molded article of Fig. 1, and it is taken along the plane indicated by the line 2—2 in Fig. 1, Fig. 3 is a sectional view, also on larger scale, of another portion of the molded article of Fig. 1, and it is taken along the plane indicated by the line 3—3 in Fig. 7, Fig. 4 is an end view of a portion of the arcuate indicia-containing surface of the molded article of Fig. 1, and it is taken at the place indicated by the curved line 4—4 in Fig. 1, Fig. 5 is a side elevational view of a portion of a molded body that is used in making the molded article of Fig. 1, Fig. 6 is a sectional view of a part the molded body of Fig. 5, and it is taken along the plane denoted by the line 6—6 in Fig. 5, Fig. 7 is another sectional view of the part of the molded body of Fig. 5, and it is also taken along the plane indicated by the line 6—6 in Fig. 5, but it shows the indicia-defining plate in moved position, Fig. 8 is a sectional view of a mold in which the molded body of Fig. 5 is molded, Fig. 9 is a side elevational view of a portion of another molded body provided by the present invention, and Fig. 10 is a side elevational view of a portion of still another molded body provided by the present invention.

Referring to the drawing in detail, the numeral 20 denotes the hub of a molded body which can be used in making a molded article; and in one preferred embodiment of the present invention that article is a counter wheel. The inner surface of the hub 20 is cylindrical; but the outer surface of that hub has a slight taper at the end to facilitate the withdrawal of the hub from the mold in which it is formed. A rim 22 is disposed concentrically of the hub 20, and a web 26 extends between and rigidly and permanently connects the hub 20 and the rim 22. The rim projects from one face of web 26 while the hub projects from the opposite face of that web. Openings 27 are provided in the web 26; and in the preferred modification shown, there are four such openings. In addition, many smaller openings 29 are provided in the web 26. The hub 20, the rim 22, and the web 26 form a rigid and sturdy molded body with an arcuate periphery.

The numerals 28, 30, 32, 34 and 36 denote indicia-defining plates or tabs, and the numeral 38 denotes yieldable or bendable connectors that extend between those plates and the rim 22. The plates define indicia; and in the preferred modification shown, they successively define the numerals from zero through nine. The indicia project upwardly from the surfaces of the plates 28, 30, 32, 34 and 36, as is emphasized particularly in Figs. 2, 3, and 6–8. Where the indicia define closed or nearly closed areas, as is the case with the zero, four, five, six, eight and nine, the plates have openings 35 through them in register with the closed or nearly closed areas. In the case of the plate that defines the numeral eight, there will be two openings 35; one in register with the upper closed area and the other in register with the lower closed area.

The various indicia-defining plates are generally rectangular in plan view, and they are preferably arcuate in section, as indicated particularly in Fig. 3. If desired, those plates could be made flat in section and then bent during the second step in the formation of the counter wheel of Fig. 1. However, in the preferred embodiment of the present invention, the plates are made arcuate in section.

The yieldable connectors 38 are thinner than the plates 28, 30, 32, 34 or 36; and thus they are able to bend or yield when side thrust is applied to those plates. The connectors 38 initially hold the plates 28, 30, 32, 34 and 36 so they extend radially outwardly from the web 26, as indicated particularly in Figs. 5, 6 and 8. However, those connectors can be readily bent to permit the plates to be moved from the radially-extending position indicated by Figs. 5, 6 and 8 to the axially-extending position indicated by Figs. 2 and 7.

The connectors 38 are closely adjacent one edge of the rim 22, and this leaves a substantial area of that rim to receive and support the plates when they have been moved to axially-extending position. The closer the connectors 38 are to that edge of the rim 22, the more support that rim can give to the plates 28, 30, 32, 34 and 36.

In the preferred embodiment of the present invention, the connectors 38 are grouped in pairs and they are disposed adjacent the leading and trailing edges of the plates. However, as indicated particularly in Figs. 9 and 10, a single short connector 50 can be used to support the plate 48, or a single long connector 55 can be used to support the plate 54. The added length of connector 55 over the length of connector 48 enables connector 55 to be made quite thin.

A number of elongated bosses 40 are formed on the rear surfaces of the leading and trailing edges of the plates 28, 30, 32, 34, 36, 48 and 54. In the particular modification shown, there are two bosses 40 at those edges of each plate. Those bosses extend rearwardly from the various plates, and their outer ends will engage an annular shoulder in the mold in which the mass of molded material is bonded to the molded body of Fig. 5. In doing so, those bosses hold the indicia on the various plates in close and intimate engagement with the smooth, concave face of that mold; and this is important since it prevents the interpositioning of some of the mass of molded material between that concave face and the indicia on the plates.

In some instances, as where the plates are quite large, additional bosses may be needed. Those additional bosses can be distributed over the rear surfaces of the various plates to assure a full and intimate engagement between the indicia of the plates and the concave surface of the mold.

The mass of molded material will flow against the rear surfaces of the plates, will pass through the openings 35, and will pass around to the outer faces of those plates. That mass of molded material will also engage and embed the bosses 40. In these ways, the mass of molded material will lock the indicia-defining plates in position axially of the molded body.

The molded body thus includes the hub 20, the web 26, the rim 22, the connectors 38, the various plates such as the plates 28, 30, 32, 34 and 36, and the bosses 40. As indicated, several of the plates have openings 35.

The mass of molded material is denoted by the numeral 44; and it is formed, in the particular modification shown, so it has gear teeth 46 at one face and has a thick rim at the other. As indicated in Fig. 2, the mass of molded material will extend through the openings 35 in the plates which have indicia that define closed areas, will pass between the leading and trailing edges of adjacent plates to completely surround the indicia on the plates, and will pass through the openings 29 to interconnect the teeth 46 with the thick rim of molded material. A hole 29 is provided adjacent each tooth in the particular form shown. In surrounding the bosses 40, the mass of molded material helps lock the plates in the position shown in Figs. 2 and 7; in flowing through the openings 35 the mass of molded material fills the closed areas of the indicia and also help lock the perforated plates in the position; in flowing past the leading and trailing edges of adjacent plates, the mass of molded material fills the spaces between the indicia and helps lock the plates in the position shown by Figs. 2 and 7; and in flowing through the openings 29 the mass of molded material helps lock the teeth 46 to the molded body. The mass of molded material will form a smooth arcuate surface of which the indicia on the plates are a part. Preferably the mass of molded material will have a color or tone that is different from the color or tone of the indicia on the plates. In that way, a good contrast can be obtained with full assurance of readability.

The material of which the molded body is made should preferably be tough enough to permit the yieldable connectors 38 to be bent and the plates to be moved to the position of Figs. 1 and 7 without causing breakage of those connectors. However, the method contemplated by the present invention can be practiced successfully even if the connectors do break, as long as those connectors continue to provide a holding engagement between the plates and the rim.

The molded body of Fig. 5 can be made in the mold indicated by Fig. 8. That mold has a male portion 56 which is equipped with recesses to define the indicia on the plates of the molded body. That male portion also has projections which help define the bendable connectors 38, 50 or 55, as the case may be. In addition, the male portion 56 also has a cylindrical passage 58 which can receive one end of a cylindrical rod 68. That cylindrical rod will define the inner surface of the hub 20. Moreover, that male portion has one or more sprues 60 through which the molten plastic material can be injected.

The female portion of the mold is denoted by the numeral 62, and it has recesses to define the plates attached to the rim 22, it has a recess to define the rim 22, it has a recess to define the web 26, it has a recess to define the lower part of the hub 20, it has a recess 64 to receive the removable sleeve 66, and it has a recess to receive one end of the cylindrical rod 70. That rod forms the opening 27 in the web 26. The sleeve 66 telescopes over the cylindrical rod 68 and serves to define the bottom face of the lower section of the hub 20. In addition, that female portion of the mold has cylindrical recesses, not shown, to receive the rods that help define the openings 29.

As indicated by Fig. 8, the molded body is formed with the plates extending radially outwardly from the rim 22. Prior to the time the mass 44 of molded material is placed in engagement with the molded body, the plates are moved from radially-extending to axially-extending position. The connectors 38, 50 or 55, as the case may be, will yield to permit such movement. If the indicia-defining plates are made to have an arcuate cross section, as indicated in Fig. 3, they will not themselves need to be bent. However, if those plates are formed so they are perfectly flat, they should be bent to have an arcuate cross section before the mass 44 of molded material is brought into engagement with the molded body.

At the time the mass 44 is brought into engagement with the molded body; that body will be in a mold with a smooth, concave surface; and the plates will be pressed tightly against that surface. The bosses 40 help make a tight engagement possible. That mold will have recesses to define the gear teeth 46 of the molded article. When the mass of molded material is injected into the mold, that mass will flow into the recesses to define the teeth 46, will flow through the openings 35 to fill those openings, will also flow between the adjacent leading and trailing edges of the other plates to fill the spaces around the indicia on the various plates, and will flow through the openings 29. After the mass 44 has hardened, the completed molded article is removed from the mold; and it will have a smooth, indicia-containing face which is free of separation lines and is free of the roughness resulting from such lines.

Whereas several preferred embodiments of the present invention have been shown and described in the drawing and accompanying description, it should be apparent to those skilled in the art that various changes may be made in the form of the invention without affecting the scope thereof.

What we claim is:

1. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part.

2. The method of making a molded article with an arcuate indicia-containing surface that comprises forming a body which has a plurality of outwardly projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part.

3. The method of making a molded article with an arcuate indicia-containing surface that comprises forming a body which has a plurality of pairs of outwardly projecting readily bendable connectors and which has a plurality of indicia-defining plates that are initially supported by said pairs of readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part.

4. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, said plates being arcuate.

5. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, a number of said plates having openings therethrough.

6. The method of making a molded article with an arcuate indicia-containing surface that comprises forming a body which has a plurality of outwardly projecting yieldable connectors and which has a plurality of indicia that are supported by said yieldable connectors, said indicia being movable through the yielding of said yieldable connectors into positions where said indicia will become part of said arcuate indicia-containing surface, moving said indicia into said positions without appreciable bending of said body, and forming a mass of molded material that engages said body and said moved indicia during a molding step and that has an arcuate surface of which the moved indicia are a part.

7. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, a number of said plates having openings therethrough, a number of said indicia defining openings through which portions of said mass of molded material can flow.

8. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotating indicia-defining plates and the indicia defined by said plates during a molding step and that has an arcuate surface of which the indicia defined by said rotated plates are a part, a number of said plates having openings therethrough, said indicia having locking surfaces thereon that can be held fixedly by said mass of molded material.

9. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors aproximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, the arcuate periphery of said body being cylindrical.

10. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, said readily bendable connectors being adjacent one edge of said periphery.

11. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, the arcuate periphery of said body being cylindrical, said readily bendable connectors being adjacent one edge of said periphery.

12. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, said readily bendable connectors being substantially coextensive with said plates.

13. The method of making a molded article with an arcuate indicia-containing surface that comprises forming a body which has an arcuate periphery and which has a plurality of radially projecting readily bendable connectors and which has a plurality of indicia-defining plates that are initially supported by said readily bendable connectors in a plane that is generally perpendicular to the axis of said arcuate periphery, bending said readily bendable connectors approximately ninety degrees relative to said body without appreciable bending of said body, said bending of said readily bendable connectors rotating said indicia-defining plates approximately ninety degrees so they are generally parallel with said arcuate periphery of said body, and forming a mass of molded material that engages said body and said rotated indicia-defining plates and the indicia defined by said plates during a molding step and that has an arcuate surface of which the indicia defined by said rotated plates are a part, said readily bendable connectors being grouped in pairs, the connectors in each pair being disposed adjacent the opposite edges of one of said plates.

References Cited in the file of this patent

UNITED STATES PATENTS

| | | |
|---|---|---|
| 2,139,541 | Farnsworth | Dec. 6, 1938 |
| 2,288,187 | Gits et al. | June 30, 1942 |
| 2,523,924 | Sawyer | Sept. 26, 1950 |

FOREIGN PATENTS

| | | |
|---|---|---|
| 524,348 | Belgium | May 17, 1954 |
| 1,081,957 | France | Dec. 24, 1954 |